(12) United States Patent
Rao

(10) Patent No.: US 11,034,325 B2
(45) Date of Patent: Jun. 15, 2021

(54) HEAD STABILIZER

(71) Applicant: Ramamohan Rao, Hidden Hills, CA (US)

(72) Inventor: Ramamohan Rao, Hidden Hills, CA (US)

(*) Notice: Subject to any disclaimer, the term of this patent is extended or adjusted under 35 U.S.C. 154(b) by 0 days.

(21) Appl. No.: 16/544,703

(22) Filed: Aug. 19, 2019

(65) Prior Publication Data

US 2020/0055483 A1 Feb. 20, 2020

Related U.S. Application Data

(60) Provisional application No. 62/719,533, filed on Aug. 17, 2018.

(51) Int. Cl.
| | |
|---|---|
| *A47C 7/38* | (2006.01) |
| *B60N 2/882* | (2018.01) |
| *B60N 2/885* | (2018.01) |
| *B60R 22/00* | (2006.01) |
| *B60R 22/20* | (2006.01) |
| *B60R 22/26* | (2006.01) |

(52) U.S. Cl.
CPC .......... *B60R 22/001* (2013.01); *A47C 7/383* (2013.01); *B60N 2/882* (2018.02); *B60N 2/885* (2018.02); *B60R 22/20* (2013.01); *B60R 22/26* (2013.01)

(58) Field of Classification Search
CPC ....... B60R 22/001; B60R 22/20; B60R 22/26; A47C 7/383; B60N 2/882; B60N 2/885
USPC .......................................... 297/392, 393, 397
See application file for complete search history.

(56) References Cited

U.S. PATENT DOCUMENTS

| | | | | | |
|---|---|---|---|---|---|
| 1,579,585 | A | * | 4/1926 | Wieder ..................... | B60N 2/77 297/392 X |
| 2,223,276 | A | * | 11/1940 | Ward ...................... | A61F 5/055 297/392 X |
| 2,267,103 | A | * | 12/1941 | Ireland ................... | B60N 2/815 297/485 |
| 2,464,435 | A | * | 3/1949 | Conradt .............. | B60R 11/0217 297/397 |
| 2,796,866 | A | * | 6/1957 | Cohen ..................... | A61C 9/00 128/869 |
| 2,973,030 | A | * | 2/1961 | Matthewson ........ | B60N 2/7005 297/393 |
| 3,173,721 | A | * | 3/1965 | Kinsman ................ | B60N 2/882 297/397 |
| 3,283,344 | A | * | 11/1966 | Blanchard ............ | A47G 9/1009 297/393 X |

(Continued)

FOREIGN PATENT DOCUMENTS

GB        2179852 A   *   3/1987   ............. A47C 7/383

*Primary Examiner* — Rodney B White
(74) *Attorney, Agent, or Firm* — Lowry Blixseth APC; Scott M. Lowry

(57) ABSTRACT

The head stabilizer includes a suspender having a pair of bracket connectors that couple to a vehicle seat and a downwardly extending vertical positioning rod having a size and shape for select slide-on reception of a lateral support unit. The lateral support unit may be secured in a desired vertical position along the rod through locking engagement with one or more notches therein. The lateral support unit includes a pair of head pads that can be drawn in to provide side-to-side support for the user's head and a headband may couple between the pair of head pads and across the forehead to provide pitch support for the head.

25 Claims, 12 Drawing Sheets

(56) References Cited

U.S. PATENT DOCUMENTS

| | | | | | |
|---|---|---|---|---|---|
| 3,542,421 | A | * | 11/1970 | Ambrose | B60N 2/6054 297/230.12 |
| 3,897,777 | A | * | 8/1975 | Morrison | A61F 5/34 5/622 |
| 4,114,948 | A | * | 9/1978 | Perkey | B60N 2/882 297/397 |
| 4,182,322 | A | * | 1/1980 | Miller | A61F 5/05883 5/637 |
| 4,339,151 | A | * | 7/1982 | Riggs | A47C 7/383 297/397 X |
| 4,707,031 | A | * | 11/1987 | Meistrell | B60R 22/001 297/393 X |
| 4,991,222 | A | * | 2/1991 | Nixdorf | H04R 5/023 297/397 X |
| 5,154,186 | A | * | 10/1992 | Laurin | A61F 5/058 5/625 |
| 5,378,042 | A | * | 1/1995 | Daneshvar | A47C 7/383 297/393 |
| 5,505,523 | A | * | 4/1996 | Wang | A47C 7/383 297/397 X |
| 5,658,245 | A | | 8/1997 | McGinnis | |
| 5,868,471 | A | * | 2/1999 | Graham | A47C 7/383 297/397 |
| 5,967,613 | A | * | 10/1999 | McKeever | A61G 5/121 297/397 |
| 6,123,389 | A | * | 9/2000 | O'Connor | A47C 7/383 297/397 |
| 6,266,825 | B1 | * | 7/2001 | Floyd | A47C 7/383 297/393 X |
| 6,305,749 | B1 | * | 10/2001 | O'Connor | A47C 7/383 297/397 |
| 6,461,256 | B1 | * | 10/2002 | Popeck | A63B 69/0059 473/450 |
| 6,601,804 | B2 | * | 8/2003 | Bisch | A47C 7/383 297/397 X |
| 6,607,245 | B1 | * | 8/2003 | Scher | A47C 7/383 297/393 |
| 6,648,416 | B2 | * | 11/2003 | O'Connor | A47C 7/383 297/397 |
| 6,893,094 | B2 | * | 5/2005 | O'Connor | A47C 7/383 297/397 |
| 7,004,545 | B2 | * | 2/2006 | Miller | A47C 7/383 297/393 |
| 7,213,884 | B2 | * | 5/2007 | Flory | B60N 2/70 297/397 X |
| 7,316,451 | B2 | * | 1/2008 | Balensiefer | A42B 3/00 297/216.12 |
| 7,393,057 | B2 | * | 7/2008 | Fraser | A47C 7/383 297/392 |
| 7,571,502 | B2 | * | 8/2009 | Frano | A61G 5/12 297/391 |
| 7,644,990 | B2 | * | 1/2010 | Pearson | A47C 7/383 297/393 |
| 7,740,318 | B2 | * | 6/2010 | Funke, III | B60N 2/2851 297/393 |
| 7,832,802 | B2 | * | 11/2010 | Ehlers | A47C 7/38 297/393 |
| 8,141,187 | B2 | * | 3/2012 | Schwingendorf | B60N 2/885 297/393 X |
| 8,287,045 | B1 | * | 10/2012 | Donohue | B60N 2/2812 297/393 |
| 8,418,293 | B2 | * | 4/2013 | Tansingco | B60N 2/882 297/393 X |
| 8,555,439 | B2 | * | 10/2013 | Soto | A61G 13/101 5/622 |
| 8,662,590 | B2 | * | 3/2014 | Bogen | A47C 7/383 297/393 |
| 8,950,813 | B2 | * | 2/2015 | Nawaz | B60N 2/844 297/393 X |
| 8,967,720 | B2 | * | 3/2015 | Davis | B60N 2/2872 297/393 |
| 8,979,196 | B2 | * | 3/2015 | Simpson | A61G 5/1091 297/397 X |
| 9,283,878 | B2 | * | 3/2016 | Zaouk | B60R 22/00 |
| 9,321,383 | B2 | * | 4/2016 | Davis | B60N 2/888 |
| 9,375,105 | B2 | * | 6/2016 | Thomson | B60N 2/882 |
| 9,566,885 | B2 | * | 2/2017 | Gazit | B60N 2/882 |
| 9,737,158 | B2 | * | 8/2017 | Kreppein | A47C 16/00 |
| 9,751,438 | B2 | * | 9/2017 | Dunham | A47C 7/383 |
| 9,795,219 | B1 | * | 10/2017 | Gracie | B60N 2/882 |
| 9,833,025 | B2 | * | 12/2017 | Knapp | B60N 2/48 |
| 10,343,572 | B2 | * | 7/2019 | Knapp | B60N 2/882 |
| 2002/0067063 | A1 | * | 6/2002 | Taborro | B60N 2/882 297/397 |
| 2006/0244299 | A1 | * | 11/2006 | Snedeker | B60N 2/882 297/393 |
| 2007/0272808 | A1 | | 11/2007 | Schuerch | |
| 2008/0238174 | A1 | * | 10/2008 | Cinquanta | B60N 2/882 297/397 |
| 2009/0189430 | A1 | | 7/2009 | Schurg | |
| 2009/0195036 | A1 | * | 8/2009 | Timmis | B62B 3/144 297/397 X |
| 2010/0102604 | A1 | * | 4/2010 | Barnes | B60N 2/818 297/250.1 |
| 2010/0237675 | A1 | * | 9/2010 | Merritt | B60N 2/2851 297/393 |
| 2011/0043025 | A1 | * | 2/2011 | Park | B60N 2/882 297/393 |
| 2012/0013164 | A1 | * | 1/2012 | McElyea | A47C 7/383 297/397 |
| 2012/0299356 | A1 | * | 11/2012 | Edwards | B60N 2/882 297/397 |
| 2013/0113267 | A1 | | 5/2013 | Davis | |
| 2014/0300169 | A1 | * | 10/2014 | Dale | B60N 2/2851 297/397 |
| 2015/0197168 | A1 | | 7/2015 | Hungerford | |
| 2015/0265062 | A1 | | 9/2015 | Blyberg | |
| 2016/0297336 | A1 | * | 10/2016 | Suomi | B60R 22/30 |
| 2017/0320413 | A1 | * | 11/2017 | Knapp | B60N 2/882 |
| 2020/0346758 | A1 | * | 11/2020 | Parrilla Calle | B64D 11/0619 |

* cited by examiner

HEAD STABILIZER

BACKGROUND OF THE INVENTION

The present invention generally relates to a head stabilizer. More specifically, the present invention relates to a head stabilizer that includes a lateral support unit and forehead support band that helps restrict side-to-side and/or forward head and neck movement relative to the seat of a moving vehicle to facilitate resting or sleeping while travelling.

Passengers in moving vehicles such as cars, buses, airplanes, trains, etc. regularly experience vibration and other head and neck motion. Not only can this be a source of discomfort, such movement makes it particularly difficult to rest or sleep while travelling. When awake, the head is generally positioned in an upright position so the chin is in front of the neck vertebra and the base of skull is to the rear. The weight of the head is thus evenly distributed between the front and back. Although, when the head drops forward, e.g., when resting or "nodding" off when tired, the weight of the head transfers to the front thereby placing excessive strain on back and neck muscles and vertebra. This unnecessary strain on the neck and back can cause inflammation if the head is left in this position for some time, e.g., napping for an extended duration while travelling. Moreover, when suddenly awakening in response to a noise (e.g., movement felt on a turbulent plane), the head may snap back up from a descended position, which causes the so-called head jerk when nodding off. Head jerk can cause vertebra to move out of its normal alignment and can lead to pain or injury.

Seats and headrests in private and commercial transportation vehicles typically do not include any (or an insufficient means) for securing the head and/or neck in the event the passenger wants or needs to rest or sleep. For example, safety restraint devices such as seatbelts are not designed to secure the head and neck relative to the seat. This is also particular problematic for children who fall asleep in child restraint seats. Commonly, children may fall asleep while travelling in a car and their head may fall forward or to the side when they fall asleep in their child restraint seat. While there are a number of issues that may contribute to the problem (e.g., the restraint seat recline angle, seat angle, position of the child, padding, pillows, etc.), the vehicle seat and/or the child restraint seat does not include a way to keep the child's head from nodding forward or falling to the side. Travelers may attempt to use impromptu solutions like pillows or rolled up blankets strategically placed in and around the head, neck, and seatback, in an attempt to provide additional head and neck support and comfort while travelling. But, these workarounds have varying degrees of success and produce inconsistent results in preventing forward and side-to-side head and neck movement when resting or sleeping while traveling.

In this respect, there are a number of prior art devices that have attempted to solve the problem of head nodding. For example, one prior art device called the SkySiesta Snug Travel Pillow manufactured and sold by SkySiesta LLC of 10635 157th Ave. NE, Redmond, Wash. 98052 generally includes two L-shaped pillows filled with a soft fiber material. The two sides connect by a non-rigid piece of fabric that causes opposite sides of the L-shaped pillows to turn inward to provide chin support when the head pushes back into the fabric connector. Furthermore, the SkySiesta Snug Travel Pillow also includes a buckle that can help keep the pillow snug. Although, one drawback of the SkySiesta Snug Travel Pillow is that the pillows are bulky and, while there is a chin support to help prevent side-to-side movement, the SkySiesta Snug Travel Pillow is still unable to keep the neck positioned relative to the vehicle seat. In other words, one can still "nod" forward or even to the side.

Another known prior art device designed as an alternative to neck pillows and travel pillows is the ZzzBand support manufactured and sold by Departure Products LLC of 2442 NW Market St. 104, Seattle, Wash. 98107. The ZzzBand includes an integrated adjustable strap made from a lightweight fleece material designed to wrap around the forehead and couple to an adjustable headrest included in some aircraft seats. The ZzzBand relies on a compressive force to draw the forehead back into engagement with the seat. While the band around the forehead may substantially prevent forward head nod, the ZzzBand is still incapable of preventing side-to-side movement. Moreover, the ZzzBand is limited in application as it can only attach to certain vehicle headrests that include the aforementioned integrated adjustable headrest. Consequently, the ZzzBand is largely unusable for use in other vehicle seats, such as cars, trains, and airplanes (given that only a limited number have seats with the built-in adjustable headrest).

Other products known in the art include U-shaped neck supports designed to fit or generally encompass the neck when worn by a user. Here, the U-shaped neck support may be filled with a soft or bead like material to provide support in and around the neck area adjacent the head. Such U-shaped neck supports are still bulky since material is needed to fill in and around the neck area to provide side-to-side support for the head. Alternatively, some U-shaped neck supports are inflatable, although these tend to provide inadequate support for the head and neck. In general, such U-shaped neck supports really only provide a minor level of support for the head and neck in preventing side-to-side movement thereof and otherwise do not substantially prevent forward head nod as a result of its U-shaped construction.

There exists, therefore, a significant need in the art for a head stabilizer that includes an adjustable lateral support unit having a pair of support pads flanking each side of the head to prevent side-to-side movement thereof, and a headband attachable thereto to simultaneously prevent forward head movement, and of which is selectively attachable vehicle seats having various sizes and/or shapes and easily collapsible for compact carriage while travelling. The present invention fulfills these needs and provides further related advantages.

SUMMARY OF THE INVENTION

In one embodiment, a head stabilizer as disclosed herein includes a suspender having a vertical positioning rod and a bracket for attachment to a seatback, a pair of lateral support pads selectively coupled with the vertical positioning rod and providing side-to-side support for a head, and an anterior support pad coupled with the pair of lateral support pads and cooperating therewith to provide anterior support for the head. Here, the pair of lateral support pads and the anterior support pad may further cooperate with the seatback when the suspender is coupled thereto to form an enclosure for retaining the head in a comfortable upright sleeping position relative to the seatback and otherwise prevent "head nod". The pair of lateral support pads and the support band may be made from a flexible material conformable to the head to enhance comfort. Moreover, the suspender, the pair of lateral support pads, and the anterior support pad may collapse upon one another to provide a compact design convenient for travel purposes.

In another aspect of these embodiments, the vertical positioning rod may include a plurality of notches for selectively locking the pair of lateral support pads in one of a plurality of vertical positions relative to the seatback. The bracket may include a pair of upwardly extending bracket arms terminating into a respective pair of adjustable curved bracket connectors selectively engageable with the seatback comprising different sizes. Additionally, the anterior support pad may include an adjustable headband having a first end that selectively couples to one of the pair of lateral support pads and a second end that selectively couples to the other of the pair of lateral support pads. Here, each of the first and second ends may be selectively detachable from the pair of lateral support pads.

In alternative embodiments, the head stabilizer may also include a support band that selectively couples with the vertical positioning rod and generally biases each of the lateral support pads in a lateral offset position relative to one another. Additionally, a pair of hinge joints may respectively couple the pair of lateral support pads to the support band. Alternatively, the pair of lateral support pads may couple to the support band about a ball and socket joint that enables multi-plane movement of the pair of lateral support pads relative to the seatback. The support band may also include a rear mounted U-shaped connector that selectively engages at least one notch in the vertical positioning rod. Here, the U-shaped connector may couple with at least one notch in a keyed relationship permitting stepped rotational movement of the support band relative to the seatback. In another aspect of this embodiment, the support band may be formed of a circular shape that includes an inner aperture. Here, a pair of connectors coupled at opposite sides of the circularly shaped support band may generally align with and selectively engage the vertical positioning rod.

In another embodiment as disclosed herein, the head stabilizer may include a suspender having a vertical positioning rod and a bracket for attachment to a seatback. The vertical positioning rod may also include a plurality of connectors formed therein for purposes of selectively positioning a support band relative thereto. In this respect, the support band may selectively adjustably couple with the plurality of connectors in locking relation therewith and generally bias a pair of lateral support pads in an offset relation relative to one another and in a position to provide side-to-side support for a head during use. An anterior support pad coupled with the pair of lateral support pads may cooperate therewith to provide pitch support for the head. Here, the pair of lateral support pads and the anterior support pad may further cooperate with the seatback when the suspender is coupled thereto to form an enclosure for retaining the head in a comfortable upright sleeping position relative to the seatback.

In an additional aspect of these embodiments, a pair of hinge joints may respectively couple the pair of lateral support pads to the support band. Moreover, the bracket may include a pair of upwardly extending bracket arms that terminate into a respective pair of adjustable curved bracket connectors selectively engageable with the seatback, which may be made from different sizes. The pair of lateral support pads may couple to the support band about a ball and socket joint to provide multi-plane movement of the pair of lateral support pads relative to the seatback. Additionally, the pair of lateral support pads and the support band may include a flexible material conformable to the head. The support band may also include a rear mounted U-shaped adapter that selectively engages at least one of the plurality of connectors in a keyed relationship that permits stepped rotational movement of the support band relative to the seatback. The anterior support pad may also include an adjustable headband having a first end that selectively couples to one of the pair of lateral support pads and a second end that selectively couples to the other of the pair of lateral support pads. Here, each of the first and second ends may be selectively detachable from the pair of lateral support pads. Of course, in these embodiments, the suspender, the support band, the pair of lateral support pads, and the anterior support pad may all collapse upon one another.

In another alternative embodiment, the head stabilizer may include a suspender having a bracket for attachment to a seatback, a lateral support unit selectively coupled with the bracket, and an anterior support pad that includes an adjustable headband having a first end that selectively couples to the lateral support unit and a second end that also selectively couples to the lateral support unit, wherein the adjustable headband cooperates with the lateral support unit to provide anterior support for a head. Here, the lateral support unit and the adjustable headband may further cooperate with the seatback when the suspender is coupled thereto to form an enclosure for retaining the head in a comfortable upright sleeping position relative to the seatback when in a use position. When in a non-use position, the lateral support unit and the anterior support pad may collapse upon one another into a relatively compact configuration.

The bracket may include a plurality of notches for selectively locking the lateral support unit in one of a plurality of vertical positions relative to the seatback and the lateral support unit may include a support band and a pair of rectangular support pads coupled thereto. Here, the support band may include a rear mounted U-shaped connector that selectively engages with the bracket at a desired vertical position. The rear mounted U-shaped connector may also selectively couple with at least one notch in the bracket in a keyed relationship permitting stepped rotational movement of the support band relative to the seatback. The support band may also be made into a generally circular shape that forms an inner aperture and includes a pair of the rear mounted U-shaped connectors at opposite sides thereof and generally aligned with and selectively engageable with the bracket.

Moreover, the pair of lateral support pads may be made from a flexible head conforming material and couple to the support band about a ball and socket joint providing multi-plane movement of the pair of lateral support pads relative to the seatback. Each of the first and second ends of the anterior support pad may be selectively detachable from the lateral support unit and the bracket may include a pair of upwardly extending bracket arms terminating into a respective pair of adjustable curved bracket connectors selectively engageable with the seatback that may be made from different sizes. The bracket may also include a downwardly extending vertical positioning rod that carries the lateral support unit.

To this end, the head stabilizer as disclosed herein may be designed to substantially reduce and/or prevent side-to-side and forward pitch movement of the head and neck that may result from head "nod" when resting or sleeping while travelling as a passenger in a vehicle. The head stabilizer may generally include lateral support unit for securing and/or stabilizing side-to-side movement of the head and/or neck of a user, a vertical support rod that facilitates connection with and vertical positioning of the lateral support unit, and a suspender designed to connect the head stabilizer to a vehicle seat.

The lateral support unit may restrict motion of the head and neck relative to the vehicle seat by providing contact at locations generally at the rear, left, and right sides of the head. In this respect, the lateral support may include a cushioned left head pad and a cushioned right head pad coupled together by an intermediately located support band, all of which cooperate to provide lateral (or side-to-side) support for the head. Each of the left head pad and the right head pad may also include an attachment mechanism such as a clip, button, Velcro strip, etc. configured to attach to opposite ends of a headband designed to be drawn across the forehead, to provide frontal support for the user's head, i.e., to prevent the head from pitching forward when "nodding" off to sleep.

Moreover, the lateral support unit may include a connector designed to attach the lateral support unit to a vertical positioning rod of the suspender. The connector may be configured for slide-on reception onto the vertical positioning rod and may couple thereto by way of one or more notches or other attachment mechanisms located along the height of the vertical positioning rod.

Additionally, the suspender may include a set of bracket arms that couple to a pair of bracket connectors designed to fit over a top of the vehicle seat. The suspender may also include a bar linking the set of bracket arms with the vertical positioning rod at a midpoint thereof.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
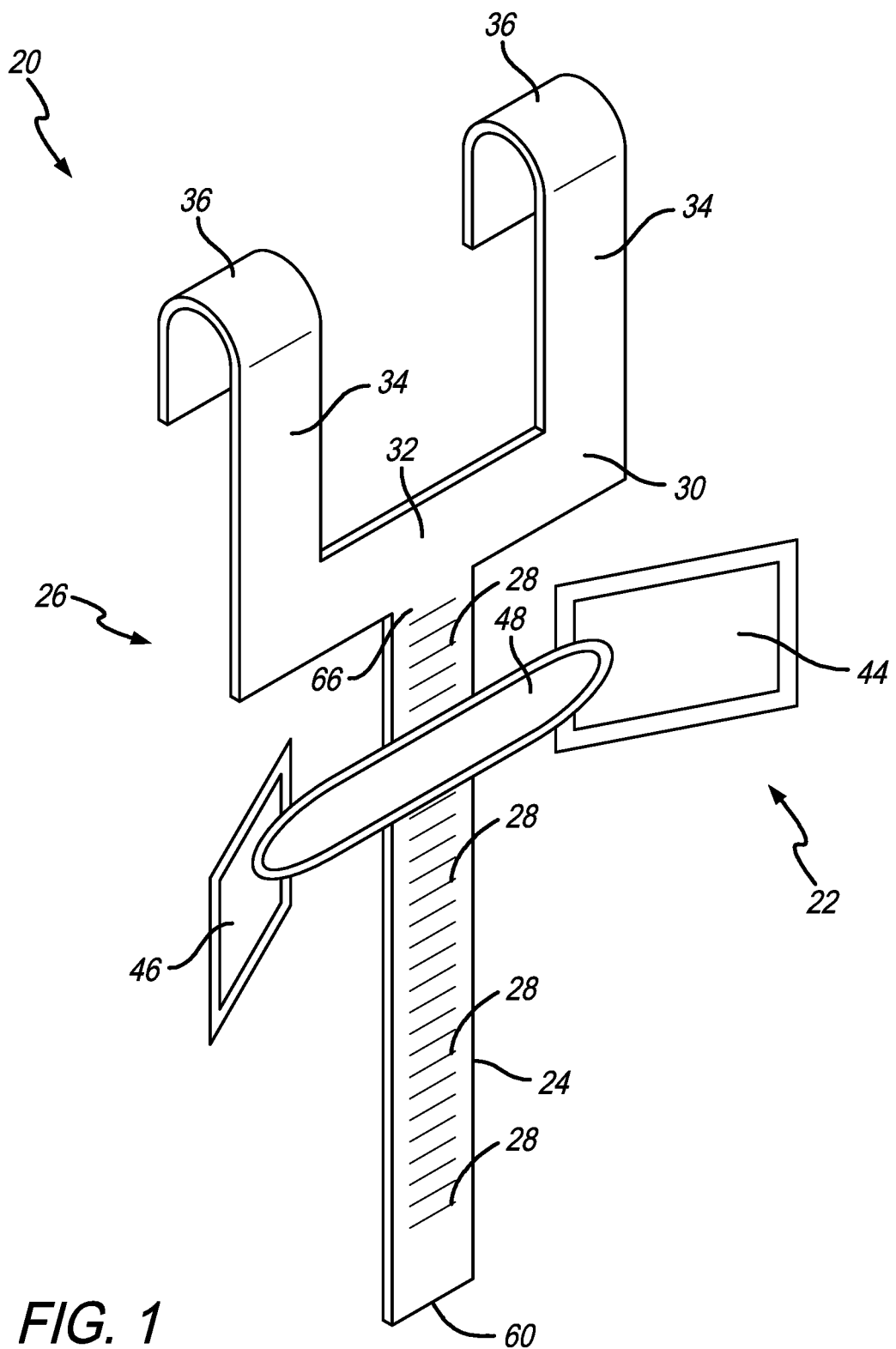
FIG. 1 is a perspective view of one embodiment of a head stabilizer having a lateral support unit selectively vertically positionable along a vertical positioning rod of a suspender.
Figure 2:
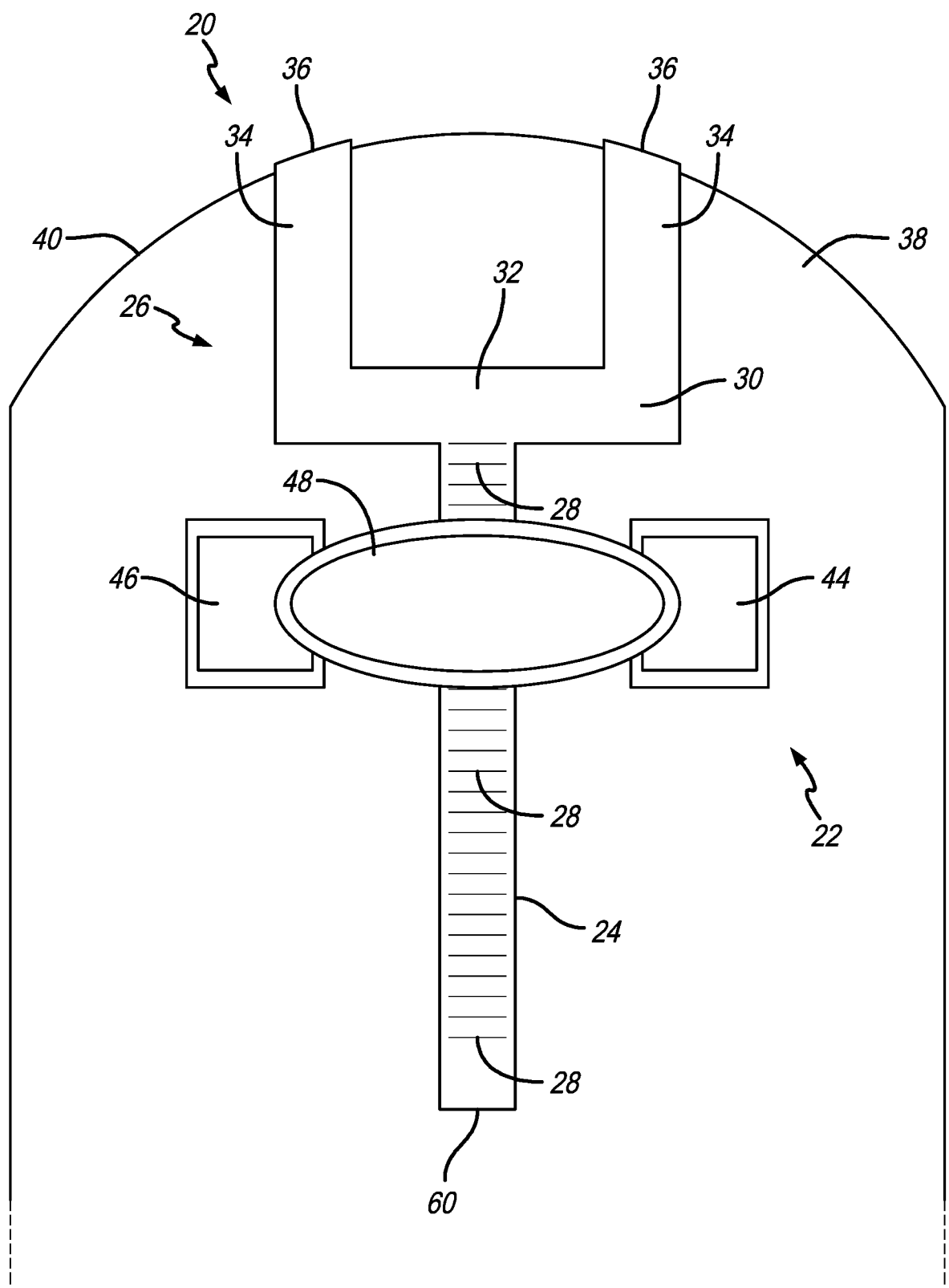
FIG. 2 is a front view of the head stabilizer of FIG. 1 hanging from a vehicle seat by way of a pair of bracket connectors.
Figure 3:
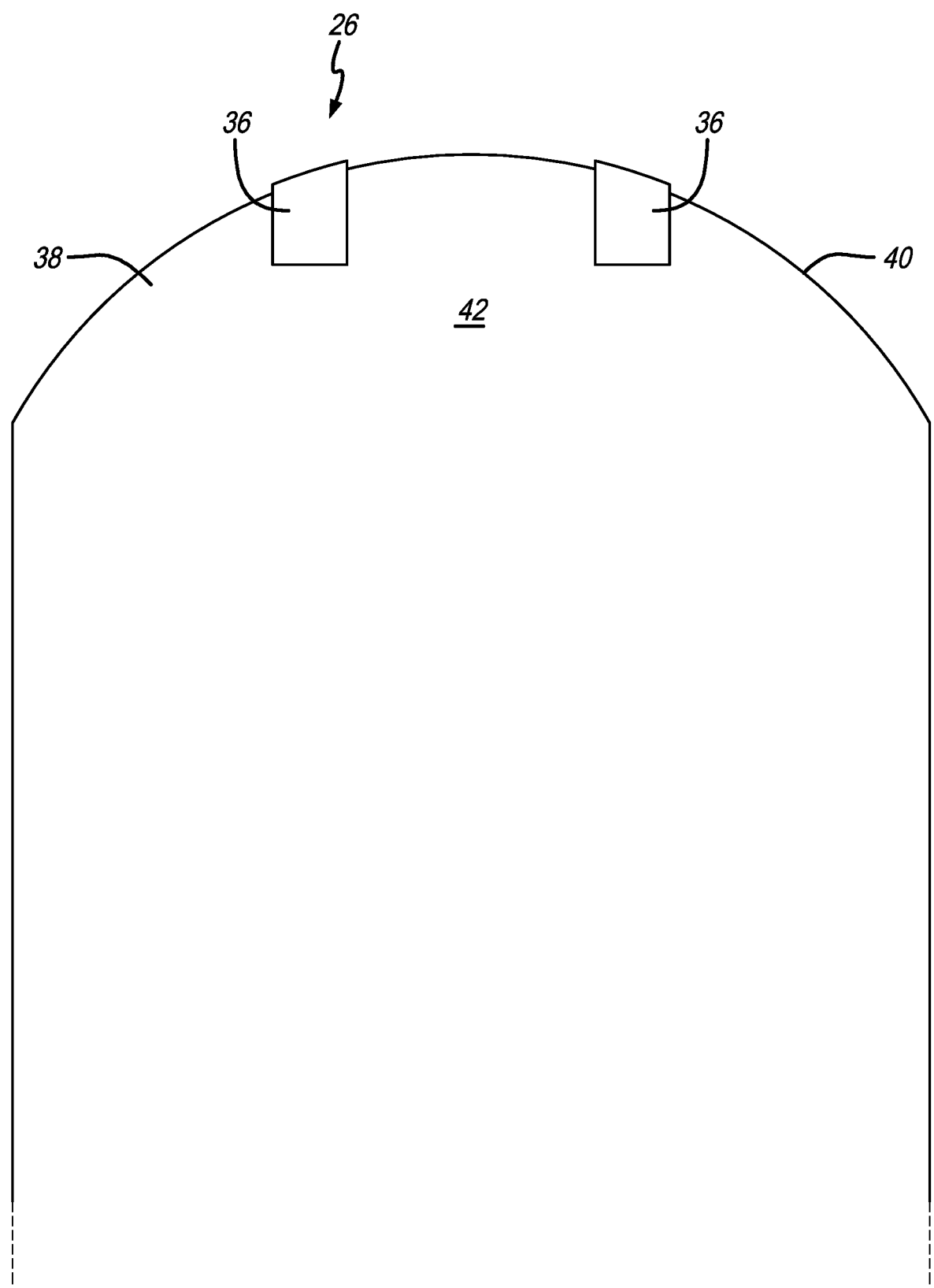
FIG. 3 is a rear view of the vehicle seat of FIG. 2, further illustrating the pair of bracket connectors attached up and over a top of the vehicle seat.

As shown in the exemplary drawings for purposes of illustration, the present invention for a head stabilizer as disclosed herein is generally referred to in FIGS. 1-2, 5-7, and 9-12 by reference numeral 20. In general, the head stabilizer 20 is designed to provide lateral or side-to-side head and neck support simultaneously while also providing head and neck forward pitch support. The head stabilizer 20 may also be collapsible and compact for convenient travel, such as when travelling as a passenger in a car, bus, train, airplane, etc. To this end, the head stabilizer 20 may allow the passenger to obtain better rest or sleep while traveling since the traveler will no longer need to worry about bothersome head nodding; rather, the head stabilizer is designed to keep the head in a comfortable upright position relative to the vehicle seat to facilitate resting or sleeping while traveling.

More specifically, FIG. 1 illustrates that the head stabilizer 20 includes a lateral support unit 22 that selectively slideably engages a vertical positioning rod 24 of a suspender 26. The vertical positioning rod 24 may include one or more notches 28 thereon that permit locking engagement of the lateral support unit 22 in the desired vertical position along the length of the vertical positioning rod 24, to maximize comfort for users of different sizes, as discussed in more detail below. In this respect, the vertical positioning rod 24 forms a generally T-shaped construction with a horizontal bar 30. The bar 30 then extends outwardly from a midpoint 32, where the vertical positioning rod 24 connects thereto, into a pair of upwardly extending bracket arms 34 that each terminate into a respective pair of curved bracket connectors 36. In one embodiment, the curved bracket connectors 36 may have a size and shape for select engagement with a vehicle seat 38. In this respect, e.g., FIGS. 2-7 and 9-12 illustrate each of the bracket connectors 36 wrapped about a top 40 of the vehicle seat 38. Here, each of the of the bracket connectors 36 may be designed to engage a rear surface 42 of the vehicle seat 38 for tensioned engagement therewith about the top 40. Alternatively, each of the bracket connectors 36 may be selectively adjustable to accommodate attachment to vehicle seats that may vary in size (e.g., thickness, etc.). In another embodiment, the bracket connectors 36 may selectively disengage the bracket arms 34 to facilitate removal and/or replacement, and may be used to adapt the size and/or shape of the bracket connectors 36 to the size and/or shape of the vehicle seat 38 to which the head stabilizer 20 will attach. In this respect, the bracket connectors 36 may be customizable, depending on the vehicle seat 38. As shown in FIGS. 2, 3, 5-7, and 9-12, the head stabilizer 20 may be positioned relative to the vehicle seat 38 by generally positioning and snuggly fitting the bracket connectors 36 to the vehicle seat 38 in the desired position (typically centric therein).

As illustrated in FIGS. 1, 2, 5-6, 8-9, and 12 the lateral support unit 22 may generally include a left head pad 44, a right head pad 46, and a support band 48 that couples to each of the left head pad 44 and the right head pad 46. As illustrated therein, the left head pad 44 and the right head pad 46 may be of a generally rectangular shape to provide enhanced surface area engagement. Although, the left head pad 44 and/or the right head pad 46 may include different shapes (e.g., round, circular, triangular, etc.) as needed or desired. Additionally, one of the head pads 44, 46 may be a different size and/or shape from the other. Each of the left head pad 44 and the right head pad 46 couple to the support band 48 in a manner that permits movement relative thereto for purposes of collapsibility and for selectively positioning each of the left head pad 44 and/or the right head pad 46 to maximize comfort and stability during use. In this respect, the left head pad 44 and/or the right head pad 46 may couple to the support band 48 by a hinge joint (e.g., to facilitate pivoting movement), by a ball and socket joint (e.g., to facilitate movement in more than one plane), or any other joint known in the art whereby one or both of the left head pad 44 and/or the right head pad 46 may be selectively positionable relative to the support band 48 as needed and/or desired.

Figure 12:
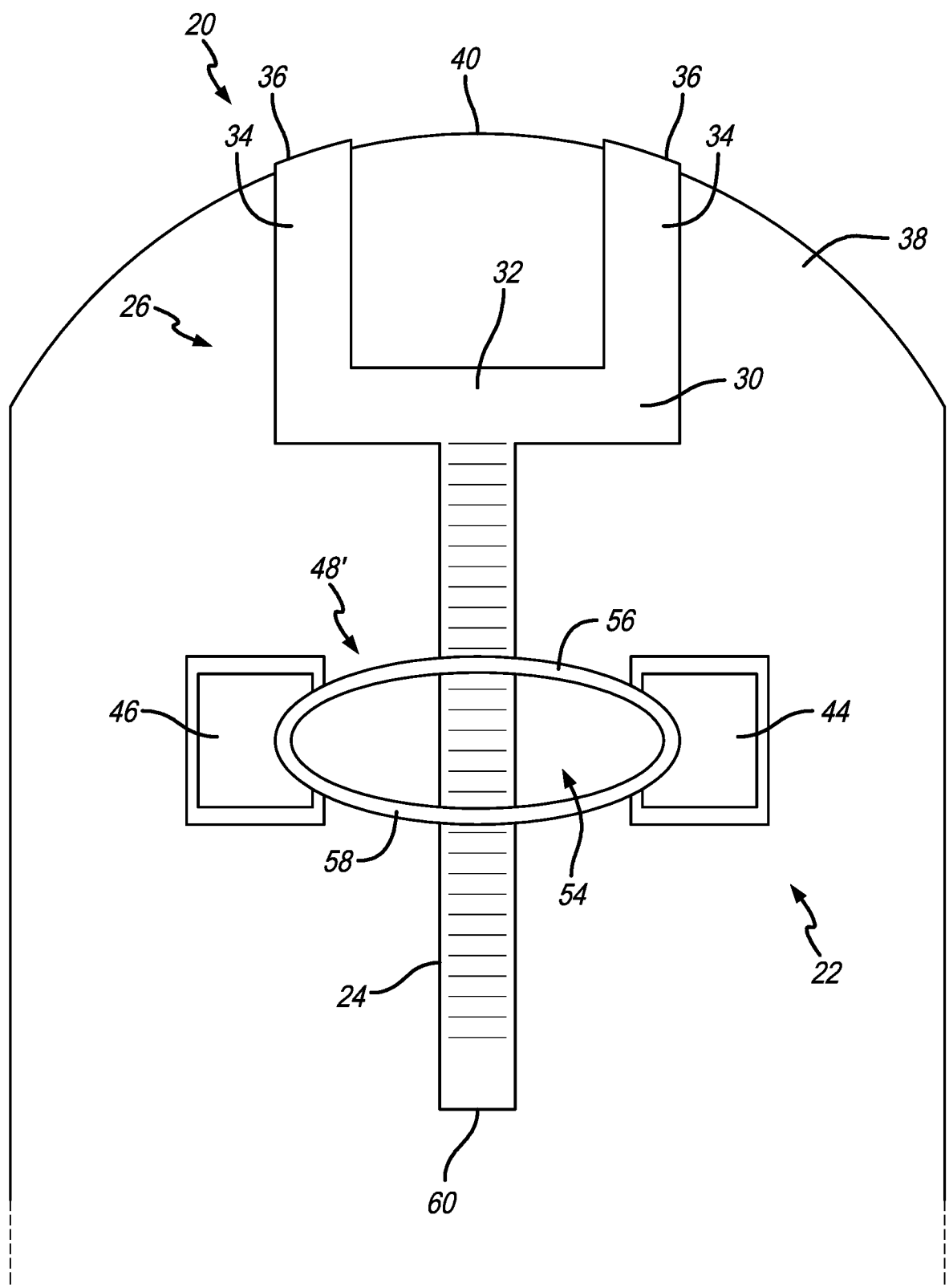
FIG. 12 is a front perspective view of an alternative embodiment of the head stabilizer having an open and relatively lightweight lateral support unit.

The support band 48 may also vary in size, shape, and/or construction to accommodate engagement with people of different sizes. For example, in one embodiment, the support band 48 may be made from a substantially rigid material that provides limited flexibility to accommodate head sizes within a certain range. Alternatively, the support band 48 may be made from a more flexible material that allows the user to conform the support band 48, along with the left head pad 44 and/or the right head pad 46, to the contour of the head, for purposes of more snuggly fitting the head stabilizer 20 thereto. In one embodiment, as illustrated in FIGS. 1-2, 5-6 and 9, the support band 48 may have a solid shape. Here, the support band 48 may include a rear mounted U-shaped connector 50 that couples to a rear surface 52 of the solid support band 48. The U-shaped connector 50 may have a size and shape for select threaded reception onto the vertical positioning rod 24 for select engagement with one of the notches 28 to selectively vertically position the lateral support unit 22 along the suspender 26. Alternatively, as illustrated in FIG. 12, a lighter weight support band 48' may be generally circular in shape, thereby forming an inner aperture 54. In this embodiment, the support band 48' may include a pair of connectors 50 that centrally attach to upper and lower sections 56, 58 of the generally elliptically shaped support band 48'. In this embodiment, each of the connectors 50 (not shown) may be vertically aligned such that the support band 48' can slidingly engage the vertical positioning rod 24 in a similar manner as the support band 48 with the single connector 50. In this embodiment, each of the notches 28 may be equidistantly spaced apart from one another along the height of the vertical positioning rod 24 such that both of the connectors 50 may simultaneously snap into and engage a respective notch 28, depending on the desired positioning of the lateral support unit 22 along the height of the vertical positioning rod 24. Having multiple of the connectors 50 may provide enhanced stability because the support band 48 would connect to the vertical positioning rod 24 at more than one location. Although, in alternative embodiments, one of the upper section 56 or the lower section 58 may include the connector 50, similar to the support band 48.

While the support bands 48, 48' are generally illustrated herein in an elliptical shape, each of the support bands 48, 48' may be made of different sizes and/or shapes as needed and/or desired. For example, in one embodiment, the support bands 48, 48' may be rectangular, square, trapezoidal, or circular. Of course, the support bands 48, 48' could also be non-geometric in shape and size.

Figure 4:
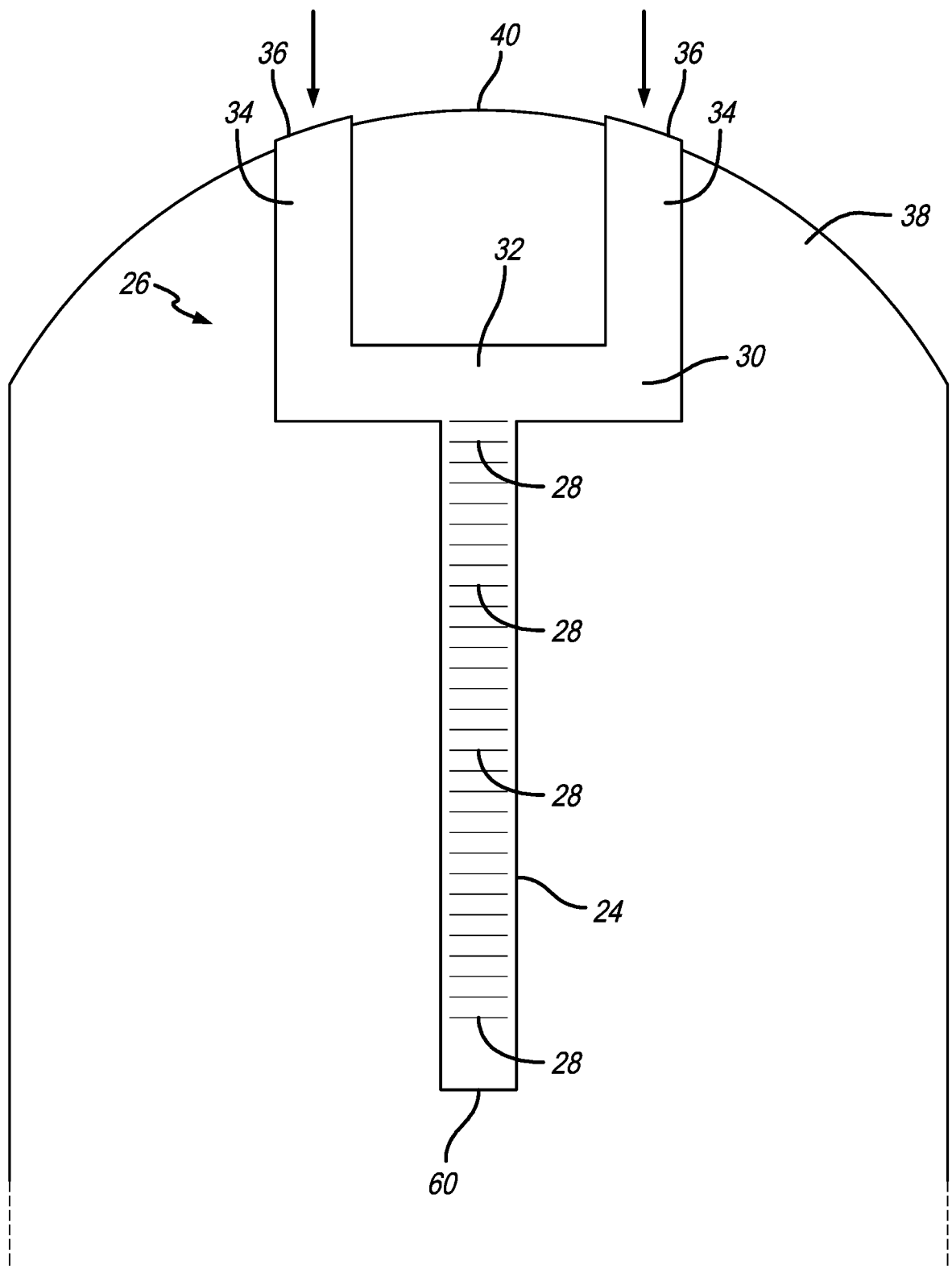
FIG. 4 is a front view of the vehicle seat, illustrating initial engagement of the suspender with the vehicle seat.
Figure 5:
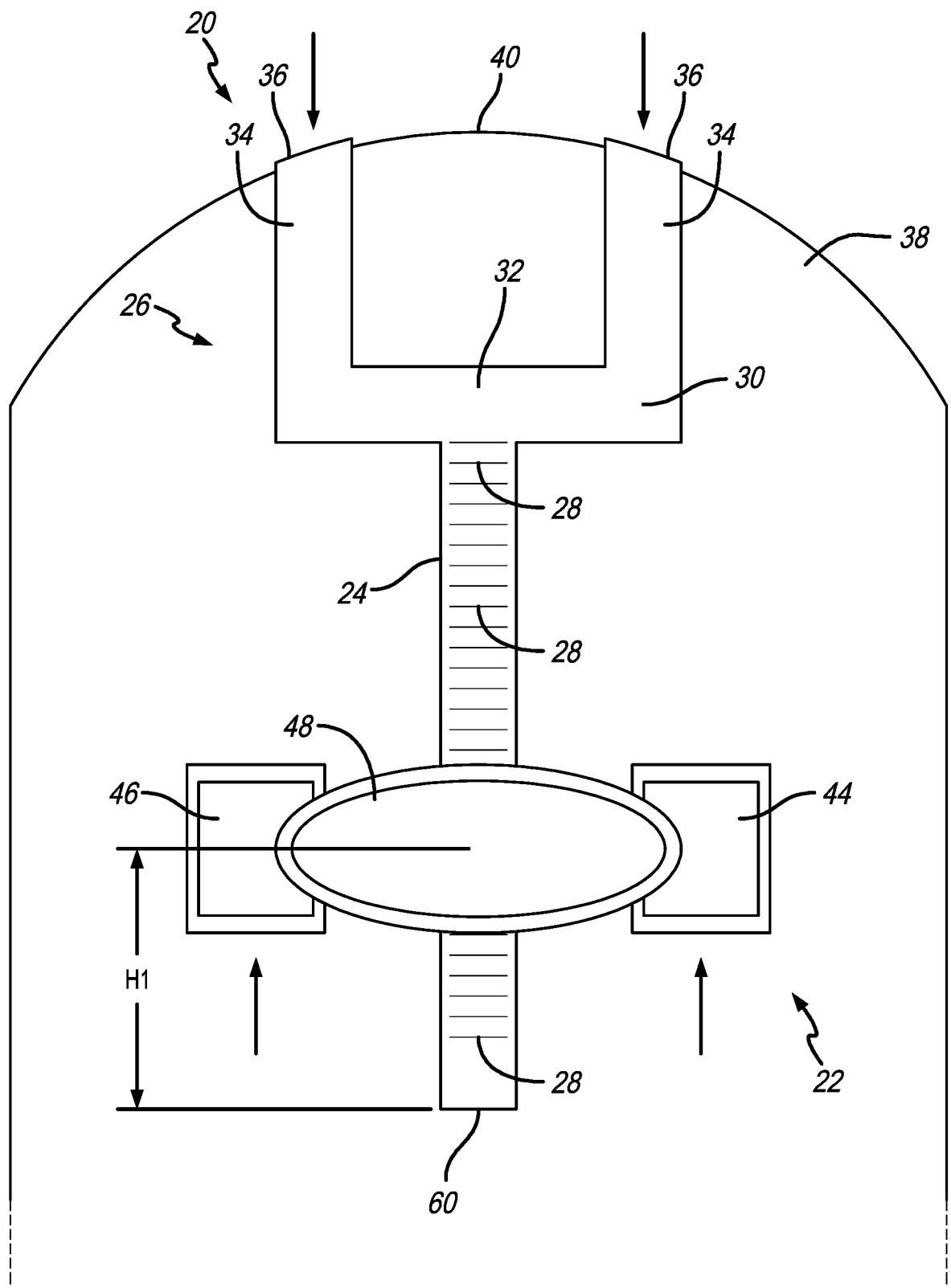
FIG. 5 is a front view of the vehicle seat with the vertical support thereon, further illustrating sliding engagement of the lateral support unit to a lower end of the vertical positioning rod of the suspender.
Figure 6:
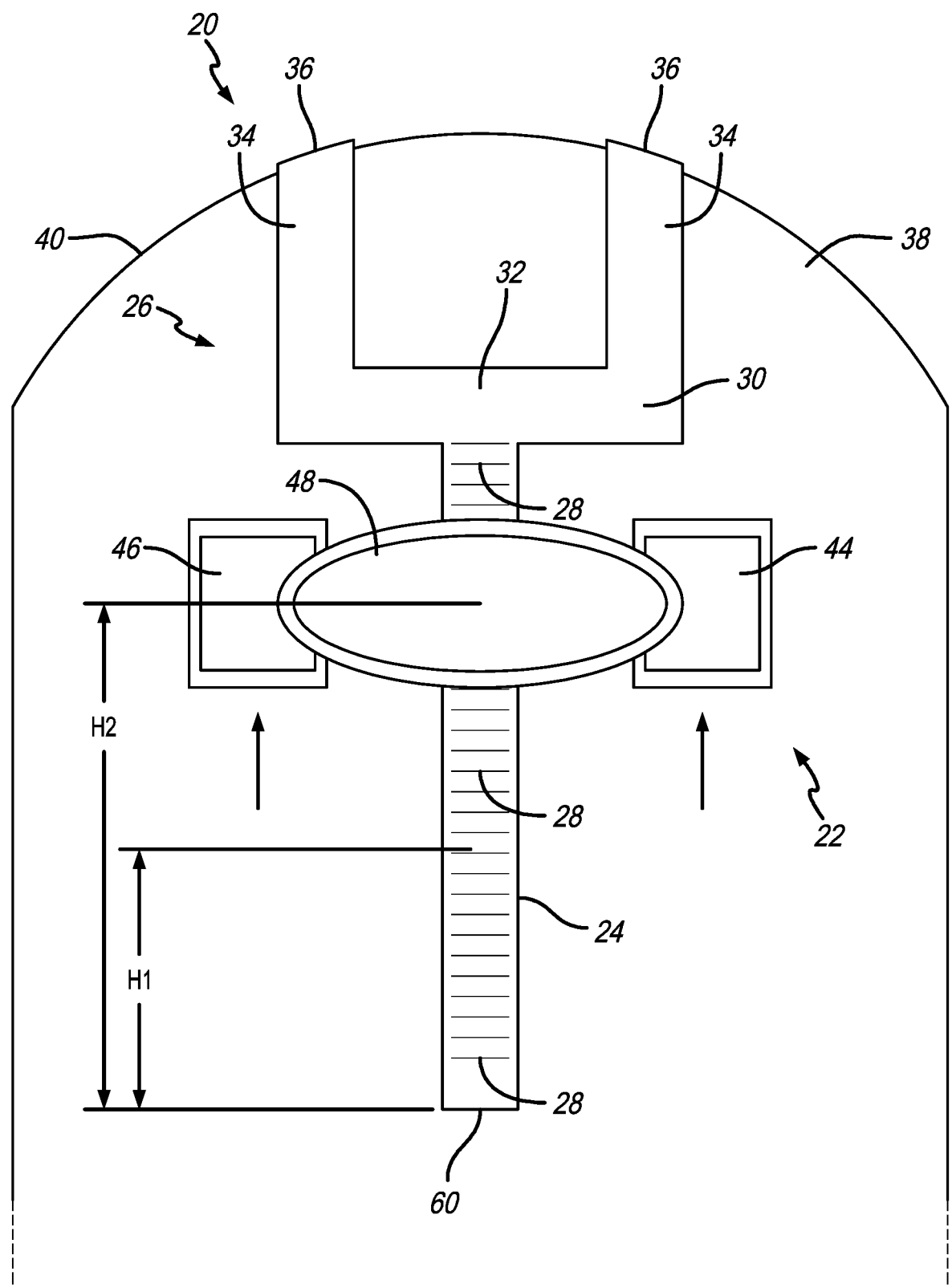
FIG. 6 is a front view similar to FIG. 5, further illustrating adjusting the vertical positioning of the lateral support unit along the height of the vertical positioning rod.

In application, as illustrated in the progression from FIG. 4 to FIG. 6, the suspender 26 is first attached to the vehicle seat 38 by way of sliding the pair of bracket connectors 36 over the top 40 of the vehicle seat 38 as indicated by the directional arrows therein. Each of the bracket connectors 36 should snuggly fit to the thickness of the vehicle seat 38, whether by tensioned engagement therewith or adjusted engagement therewith. This effectively attaches the suspender 26 in a relatively static position relative to the vehicle seat 38 and helps provide stability when using the head stabilizer 20 during travel. Then, as illustrated in FIG. 5, the lateral support unit 22 slides onto the vertical positioning rod 24 by threading the U-shaped connector 50 onto a lower end 60 thereof, as illustrated by the directional arrows therein. Here, once the lateral support unit 22 is in the desired vertical position, the connector 50 may snap into or otherwise engage one of the notches 28 by any locking mechanism known in the art to substantially retain the lateral support unit 22 in the desired vertical position on the suspender 26. As shown in FIG. 5, the height of the lateral support unit 22 along the vertical positioning rod 24 may be initially set to a height H1.

Figure 7:
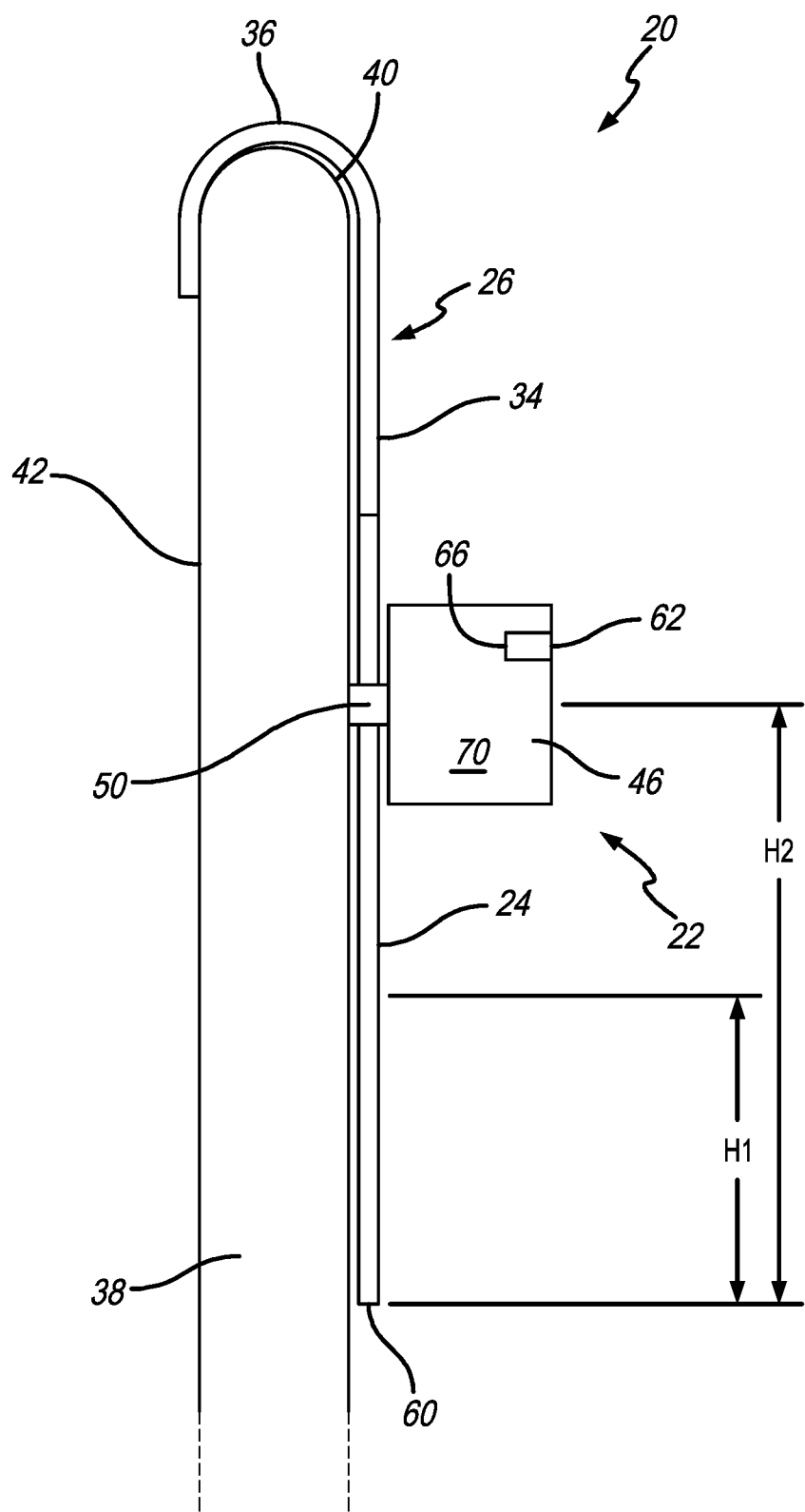
FIG. 7 is a side view of the head stabilizer of FIGS. 2, 5 and 6.

Although, unlocking engagement of the connector 50 with the notch 28 may permit the lateral support unit 22 to again slide vertically relative to the suspender 26 along the vertical positioning rod 24, thereby facilitating vertical adjustment of the lateral support unit 22. As an example, the connector 50 of the lateral support unit 22 may be disconnected from one of the notches 28 that positions the lateral support unit 22 at the height H1 (FIG. 5), thereby allowing the lateral support unit 22 to move vertically along the length of the vertical positioning rod 24. In one embodiment, the connector 50 may be configured for keyed engagement with the vertical positioning rod 24 to prevent pivoting or rotating movement of the lateral support unit 22 relative to the suspender 26. Alternatively, in another embodiment, the keyed relationship between the connector 50 and the vertical positioning rod 24 may permit select stepped rotational or pivoting movement of the lateral support unit 22 relative to the suspender 26. This may permit the user to angularly offset the lateral support unit 22 relative to the suspender 26, e.g., for purposes of angled rest or sleep. Once free, the lateral support unit 22 may slide up/down along the height of the vertical positioning rod 24, such as from the height H1 in FIG. 5 to the height H2 in FIG. 6. In this respect, FIG. 7 illustrates a side view of the lateral support unit 22 being repositioned from the height H1 to the height H2 along the length of the vertical positioning rod 24. Here, again, the lateral support unit 22 may be fixed relative to the suspender 26 by engaging the connector 50 with another one of the notches 28 at the desired H2 height.

Figure 8:
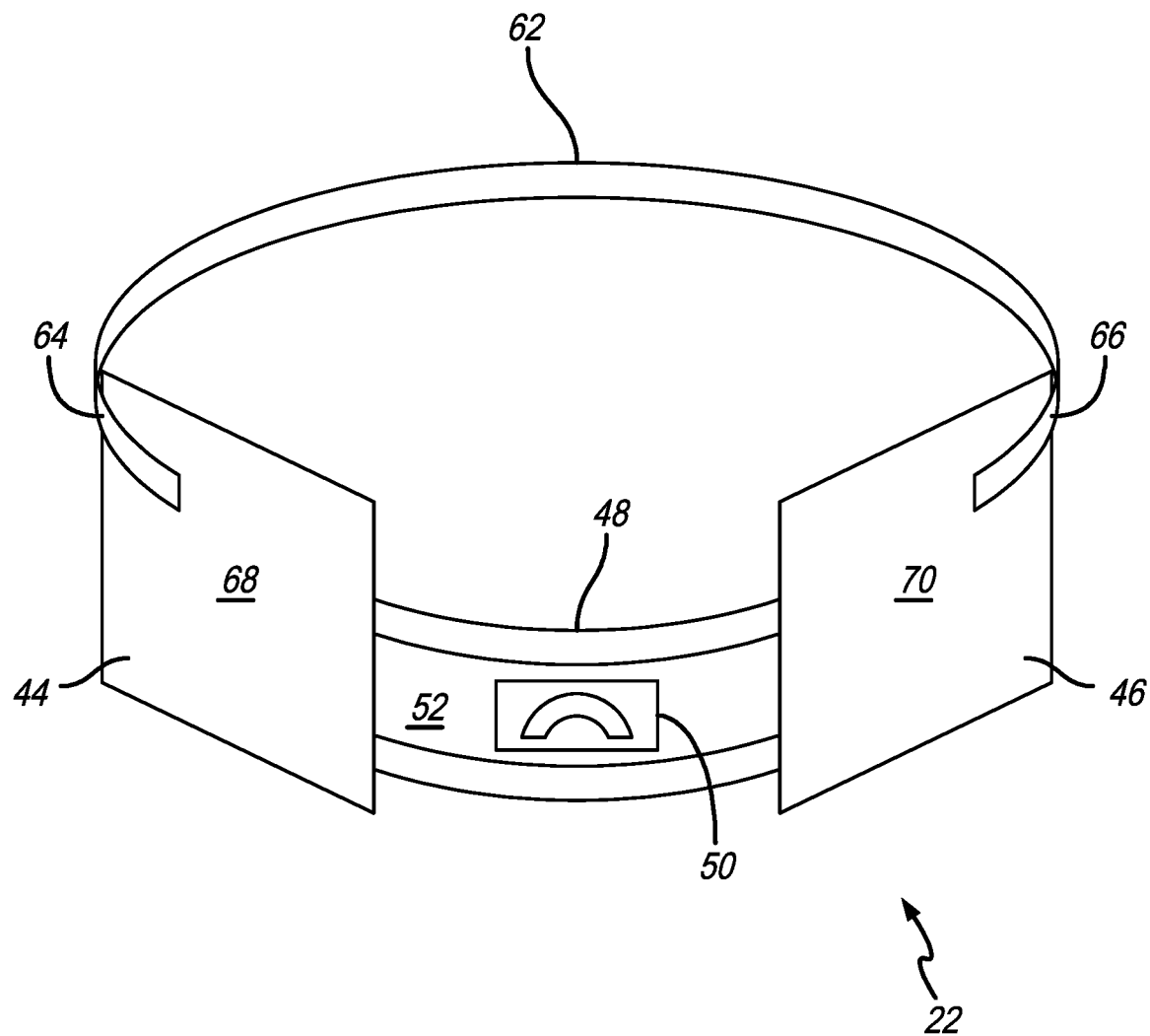
FIG. 8 is a rear perspective view of the lateral support unit, further illustrating a headband coupled to each of a left head pad and a right head pad.
Figure 9:
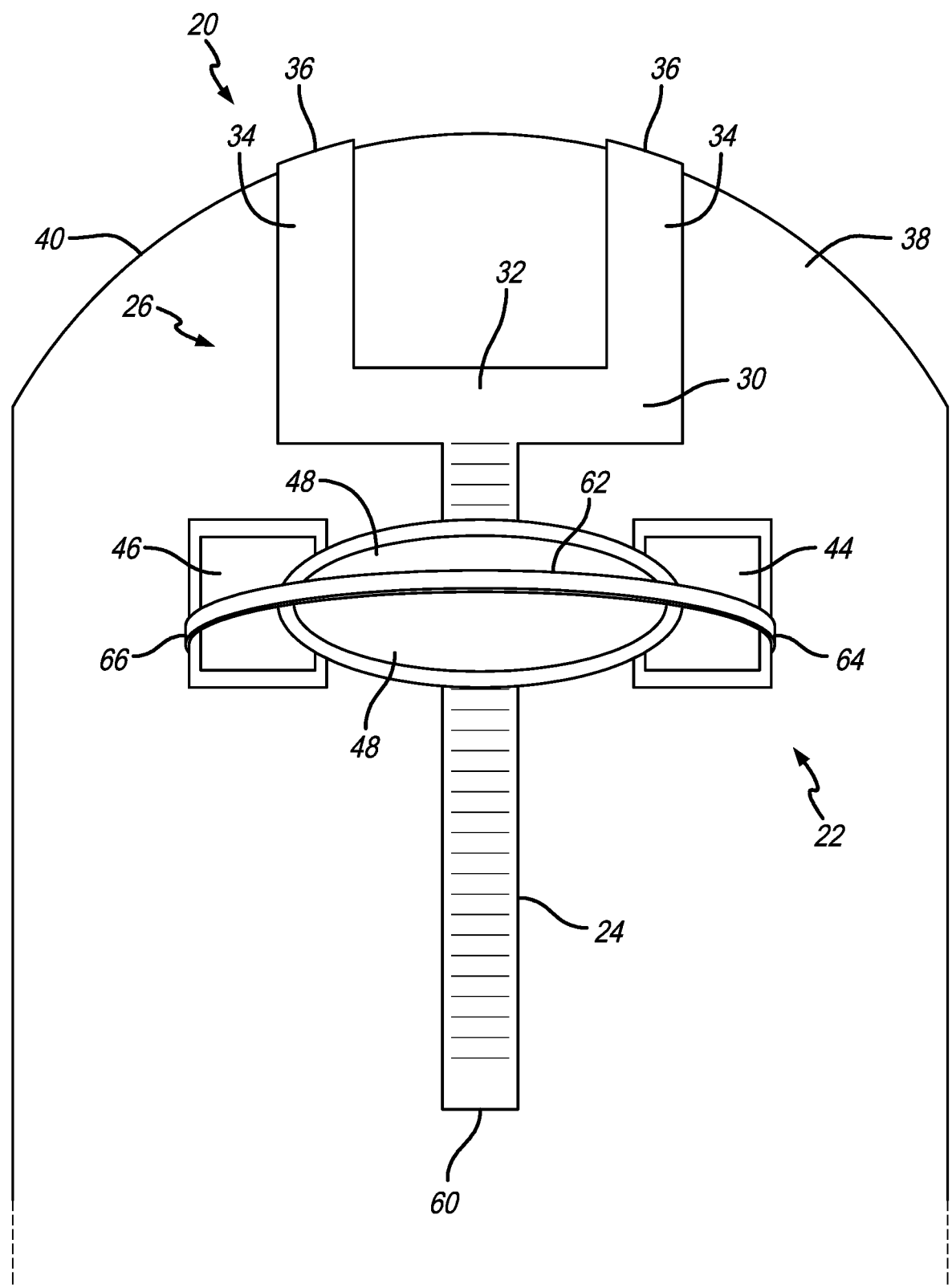
FIG. 9 is a front perspective view of the head stabilizer similar to FIGS. 2 and 6, further illustrating the headband attached to each of the left head pad and the right head pad.

FIG. 8 more specifically illustrates that the lateral support unit 22 may also include a headband 62 having a first end 64 that selectively couples to one of the pads 44, 46 and a second end 66 that selectively couples to the other of the pads 44, 46, such as by snap-fit engagement, Velcro, or another comparable attachment mechanism that facilitates select attachment and/or removal of the headband from each of the pads 44, 46. The headband 62 may be made from a comfortable material such as fabric and may generally be in the shape of an elongated rectangle, although the headband 62 may be made out of other materials and have a different size and/or shape. As shown in FIG. 8, the first end 64 of the headband 62 may attach to an outer surface 68 of the left head pad 44 and the second end 66 may attach to an outer surface 70 of the right head pad 46, and vice versa. In this respect, the attachment of each of the ends 64, 66 to the respective pads 44, 46 may also be adjustable (e.g., like a belt or the like) such that the distance the headband 62 extends between each of the left head pad 44 and the right head pad 46 can vary from user to user. This may also help facilitate pulling the headband 62 taut against a forehead 72 (FIGS. 10 and 11) of a user 74 during use, as discussed in more detail below.

Figure 10:
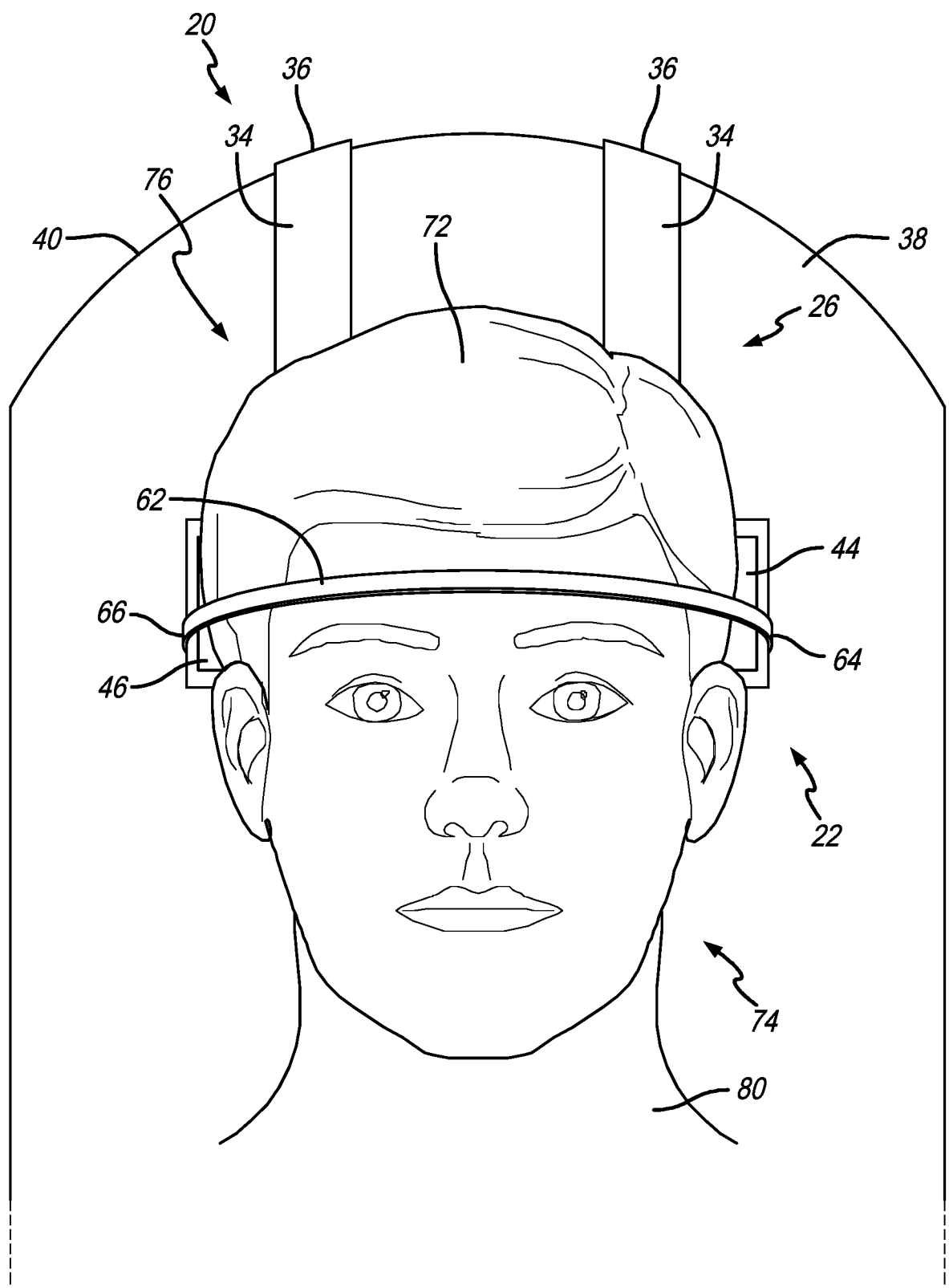
FIG. 10 is a front view similar to FIG. 9, further illustrating a human head supported within the head stabilizer by the lateral support unit and the headband.
Figure 11:
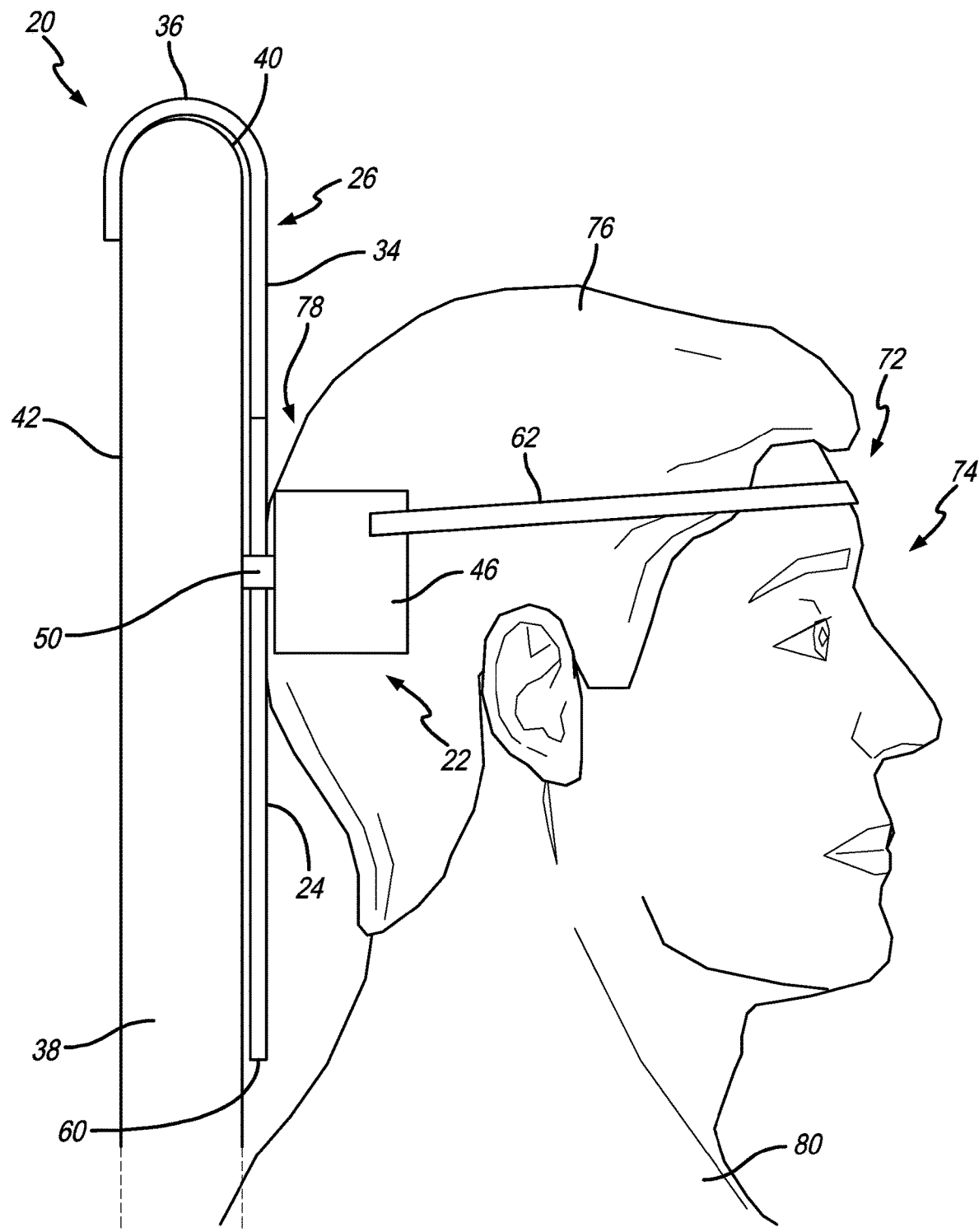
FIG. 11 is a side view of FIG. 10, further illustrating the human head secured within the lateral support unit and the headband.

FIGS. 10 and 11 more specifically illustrate use of the head stabilizer 20 in accordance with the embodiments disclosed herein. After attachment of the head stabilizer 22 to the vehicle seat 38, as disclosed above with respect to FIGS. 5-7, the user 74 may lean its head 76 back toward the vehicle seat 38 for placement between the outwardly projecting pads 44, 46. In this respect, a rear portion 78 of the head 76 may first come into contact with the support band 48. This may help the user 74 align its head 76 within the pads 44, 46. Next, the user 74 may inwardly bend each of the left head pad 44 and the right head pad 46 to locate each adjacent the head 76 of the user 74. Here, the left head pad 44 and the right head pad 46 may make respective contact with the left and right sides of the head 76, to provide lateral support thereto. Next, to further secure the head 76 therein, the user 74 may attach one of the first end 64 or the second end 66 to one of the outer surface 68 or the outer surface 70 of the lateral support unit 22, then draw the headband 62 across the forehead 72 for respective attachment of the other of the first end 64 or the second end 66 to the other of the outer surface 68 or the outer surface 70. This process draws the headband 62 into engagement with the forehead 72 to provide frontal support thereof and prevent forward pitch movement of the head 76 relative to the vehicle seat 38. This can also help retain each of the left head pad 44 and the right head pad 46 positioned adjacent the head 76, as disclosed above. The headband 62, therefore, can be especially useful to prevent head nodding and side-to-side movement when attempting to rest or sleep while traveling.

As shown best in FIGS. 10 and 11, the support band 48, the left head pad 44, the right head pad 46, and the headband 48 may be configured to generally encircle the head 76 of the user 74 to maintain the head 76 in the generally upright position illustrated therein. To this end, in the event the user 74 falls asleep, the head 76 may remain supported in the upright position by one or more of the support band 48, the left head pad 44, the right head pad 46, and/or the headband 48 simultaneously. Accordingly, the head stabilizer 20 may simultaneously restrict leftward, rightward, backward, and forward motion of the head 76. Importantly, the neck 80 may remain in a substantially upright position so as to reduce stress on the neck muscles and related vertebrae.

Although several embodiments have been described in detail for purposes of illustration, various modifications may be made without departing from the scope and spirit of the invention. Accordingly, the invention is not to be limited, except as by the appended claims.

What is claimed is:

1. A head stabilizer, comprising:
   a suspender having a vertical positioning rod and a bracket for attachment to a seatback;
   a pair of lateral support pads selectively coupled with the vertical positioning rod and providing side-to-side support for a head;
   a support band selectively coupled with the vertical positioning rod and generally biasing each of the lateral support pads in a lateral offset position relative to one another, wherein the pair of lateral support pads couple to the support band about a ball and socket joint providing multi-plane movement of the pair of lateral support pads relative to the seatback; and
   an anterior support pad coupled with the pair of lateral support pads and cooperating therewith to provide anterior support for the head, the pair of lateral support pads and the anterior support pad further cooperate with the seatback when the suspender is coupled thereto to form an enclosure for retaining the head in a comfortable upright sleeping position relative to the seatback.

2. The head stabilizer of claim 1, wherein the suspender, the pair of lateral support pads, and the anterior support pad collapse upon one another.

3. The head stabilizer of claim 1, wherein the vertical positioning rod includes a plurality of notches for selectively locking the pair of lateral support pads in one of a plurality of vertical positions relative to the seatback.

4. The head stabilizer of claim 1, wherein the bracket comprises a pair of upwardly extending bracket arms terminating into a respective pair of adjustable curved bracket connectors selectively engageable with the seatback comprising different sizes.

5. The head stabilizer of claim 1, wherein the pair of lateral support pads and the support band comprise a flexible material conformable to the head.

6. The head stabilizer of claim 1, wherein the support band includes a rear mounted U-shaped connector that selectively engages at least one notch in the vertical positioning rod.

7. The head stabilizer of claim 6, wherein the U-shaped connector couples with the at least one notch in a keyed relationship permitting stepped rotational movement of the support band relative to the seatback.

8. The head stabilizer of claim 1, wherein the support band comprises a circular shape forming an inner aperture and including a pair of connectors at opposite sides thereof and generally aligned with and selectively engageable with the vertical positioning rod.

9. The head stabilizer of claim 1, wherein the anterior support pad comprises an adjustable headband having a first end that selectively couples to one of the pair of lateral support pads and a second end that selectively couples to the other of the pair of lateral support pads, each of the first and second ends being selectively detachable from the pair of lateral support pads.

10. A head stabilizer, comprising:
    a suspender having a vertical positioning rod and a bracket for attachment to a seatback, the vertical positioning rod including a plurality of connectors formed therein;
    a support band that selectively adjustably couples with the plurality of connectors in locking relation therewith and generally biases a pair of lateral support pads in an offset relation relative to one another and in a position to provide side-to-side support for a head during use, wherein the pair of lateral support pads couple to the support band about a ball and socket joint providing multi-plane movement of the pair of lateral support pads relative to the seatback; and
    an anterior support pad coupled with the pair of lateral support pads and cooperating therewith to provide pitch support for the head, the pair of lateral support pads and the anterior support pad further cooperate with the seatback when the suspender is coupled thereto to form an enclosure for retaining the head in a comfortable upright sleeping position relative to the seatback.

11. The head stabilizer of claim 10, wherein the suspender, the support band, the pair of lateral support pads, and the anterior support pad collapse upon one another.

12. The head stabilizer of claim 10, wherein the pair of lateral support pads and the support band comprise a flexible material conformable to the head, the support band including a rear mounted U-shaped adapter that selectively engages at least one of the plurality of connectors in a keyed relationship permitting stepped rotational movement of the support band relative to the seatback.

13. The head stabilizer of claim 10, wherein the anterior support pad comprises an adjustable headband having a first end that selectively couples to one of the pair of lateral support pads and a second end that selectively couples to the other of the pair of lateral support pads, each of the first and second ends being selectively detachable from the pair of lateral support pads.

14. A portable head stabilizer, comprising:
a suspender having a bracket for attachment to a seatback;
a lateral support unit selectively coupled with the bracket, wherein the lateral support unit includes a support band and a pair of rectangular support pads coupled thereto, the support band including a rear mounted U-shaped connector that selectively engages with the bracket at a desired vertical position; and
an anterior support pad comprising an adjustable headband having a first end that selectively couples to the lateral support unit and a second end that also selectively couples to the lateral support unit, the anterior support pad cooperating with the lateral support unit to provide anterior support for a head and further cooperating with the seatback when the suspender is coupled thereto to form an enclosure for retaining the head in a comfortable upright sleeping position relative to the seatback when in a use position and, when in a non-use position, the suspender, the lateral support unit, and the anterior support pad collapse upon one another into a relatively compact configuration.

15. The head stabilizer of claim 14, wherein the bracket includes a plurality of notches for selectively locking the lateral support unit in one of a plurality of vertical positions relative to the seatback.

16. The head stabilizer of claim 14, wherein the pair of lateral support pads comprise a flexible head conforming material and couple to the support band about a ball and socket joint providing multi-plane movement of the pair of lateral support pads relative to the seatback.

17. The head stabilizer of claim 14, wherein the rear mounted U-shaped connector selectively couples with at least one notch in the bracket in a keyed relationship permitting stepped rotational movement of the support band relative to the seatback, the support band comprising a circular shape forming an inner aperture and including a pair of the rear mounted U-shaped connectors at opposite sides thereof and generally aligned with and selectively engageable with the bracket.

18. The head stabilizer of claim 14, wherein each of the first and second ends of the anterior support pad are selectively detachable from the lateral support unit.

19. The head stabilizer of claim 14, wherein the bracket comprises a pair of upwardly extending bracket arms terminating into a respective pair of adjustable curved bracket connectors selectively engageable with the seatback comprising different sizes and a downwardly extending vertical positioning rod carrying the lateral support unit.

20. A head stabilizer, comprising:
a suspender having a vertical positioning rod and a bracket for attachment to a seatback;
a pair of lateral support pads selectively coupled with the vertical positioning rod and providing side-to-side support for a head;
a support band selectively coupled with the vertical positioning rod and generally biasing each of the lateral support pads in a lateral offset position relative to one another, wherein the pair of lateral support pads and the support band comprise a flexible material conformable to the head; and
an anterior support pad coupled with the pair of lateral support pads and cooperating therewith to provide anterior support for the head, the pair of lateral support pads and the anterior support pad further cooperate with the seatback when the suspender is coupled thereto to form an enclosure for retaining the head in a comfortable upright sleeping position relative to the seatback.

21. A head stabilizer, comprising:
a suspender having a vertical positioning rod and a bracket for attachment to a seatback;
a pair of lateral support pads selectively coupled with the vertical positioning rod and providing side-to-side support for a head;
a support band selectively coupled with the vertical positioning rod and generally biasing each of the lateral support pads in a lateral offset position relative to one another, wherein the support band includes a rear mounted U-shaped connector that selectively engages at least one notch in the vertical positioning rod; and
an anterior support pad coupled with the pair of lateral support pads and cooperating therewith to provide anterior support for the head, the pair of lateral support pads and the anterior support pad further cooperate with the seatback when the suspender is coupled thereto to form an enclosure for retaining the head in a comfortable upright sleeping position relative to the seatback.

22. A head stabilizer, comprising:
a suspender having a vertical positioning rod and a bracket for attachment to a seatback;
a pair of lateral support pads selectively coupled with the vertical positioning rod and providing side-to-side support for a head;
a support band selectively coupled with the vertical positioning rod and generally biasing each of the lateral support pads in a lateral offset position relative to one another, wherein the support band comprises a circular shape forming an inner aperture and including a pair of connectors at opposite sides thereof and generally aligned with and selectively engageable with the vertical positioning rod; and
an anterior support pad coupled with the pair of lateral support pads and cooperating therewith to provide anterior support for the head, the pair of lateral support pads and the anterior support pad further cooperate with the seatback when the suspender is coupled thereto to form an enclosure for retaining the head in a comfortable upright sleeping position relative to the seatback.

23. A head stabilizer, comprising:
a suspender having a vertical positioning rod and a bracket for attachment to a seatback;

a pair of lateral support pads selectively coupled with the vertical positioning rod and providing side-to-side support for a head; and an anterior support pad coupled with the pair of lateral support pads and cooperating therewith to provide anterior support for the head, the pair of lateral support pads and the anterior support pad further cooperate with the seatback when the suspender is coupled thereto to form an enclosure for retaining the head in a comfortable upright sleeping position relative to the seatback, wherein the anterior support pad comprises an adjustable headband having a first end that selectively couples to one of the pair of lateral support pads and a second end that selectively couples to the other of the pair of lateral support pads, each of the first and second ends being selectively detachable from the pair of lateral support pads.

24. A head stabilizer, comprising:

a suspender having a vertical positioning rod and a bracket for attachment to a seatback, the vertical positioning rod including a plurality of connectors formed therein;

a support band that selectively adjustably couples with the plurality of connectors in locking relation therewith and generally biases a pair of lateral support pads in an offset relation relative to one another and in a position to provide side-to-side support for a head during use, wherein the pair of lateral support pads and the support band comprise a flexible material conformable to the head, the support band including a rear mounted U-shaped adapter that selectively engages at least one of the plurality of connectors in a keyed relationship permitting stepped rotational movement of the support band relative to the seatback; and an anterior support pad coupled with the pair of lateral support pads and cooperating therewith to provide pitch support for the head, the pair of lateral support pads and the anterior support pad further cooperate with the seatback when the suspender is coupled thereto to form an enclosure for retaining the head in a comfortable upright sleeping position relative to the seatback.

25. A portable head stabilizer, comprising:

a suspender having a bracket for attachment to a seatback;

a lateral support unit selectively coupled with the bracket; and an anterior support pad comprising an adjustable headband having a first end that selectively couples to the lateral support unit and a second end that also selectively couples to the lateral support unit, the anterior support pad cooperating with the lateral support unit to provide anterior support for a head and further cooperating with the seatback when the suspender is coupled thereto to form an enclosure for retaining the head in a comfortable upright sleeping position relative to the seatback when in a use position and, when in a non-use position, the suspender, the lateral support unit, and the anterior support pad collapse upon one another into a relatively compact configuration, wherein the lateral support unit comprises a flexible head conforming material and couples to the support band about a ball and socket joint providing multi-plane movement of the lateral support unit relative to the seatback.

* * * * *